July 27, 1943.  L. W. SETZ  2,325,430
SHOCK ABSORBING MECHANISM
Filed May 7, 1941

Inventor
Louis W. Setz

Patented July 27, 1943

2,325,430

UNITED STATES PATENT OFFICE 2,325,430

SHOCK ABSORBING MECHANISM

Louis W. Setz, Omaha, Nebr.

Application May 7, 1941, Serial No. 392,320

18 Claims. (Cl. 267—34)

I

This invention relates to a shock absorbing and spring mechanism adapted to be applied to stationary or movable objects such as a vehicle, chair, gun, machine, or other object for absorbing, preventing or modifying the effects of motion or of force directed to such objects by explosions, collisions, pressure, or shocks or vibrations occasioned by exterior force or by the motion of such stationary or movable objects.

The invention includes the use of springs, the action of liquids under compression, and the compression and expansion of air for spring action and for modifying or preventing shocks. Also, the invention includes the use of a piston movable in a cylinder with means for a control of such movement of the piston and means to prevent excess friction of the moving piston. Other objects of the invention will appear more fully hereinafter.

II

The principal object of the invention is to provide anti-friction, shock absorbing, graduated and controlled spring and recoil mechanism for general use on any stationary or movable objects, such as a vehicle, conveyance, chair, seat, gun, machine, object or the like.

The invention consists of the new and useful construction, combination and arrangement of parts described herein and claimed, and as shown in the accompanying drawings, it being understood that changes in form, size, proportion of parts and minor details may be made by applicant, said changes being within the scope of the invention as claimed.

III

To the accomplishment of the above and subordinate objects presently appearing, a preferred embodiment of the invention has been illustrated in the accompanying drawing set forth in detail in the following description, and defined in the claims appended hereto:

In said drawing, Figure 1 is a view in longitudinal section of a shock absorbing mechanism showing one embodiment of the invention.

IV

Figures 1, 2, 3, 4, 5:
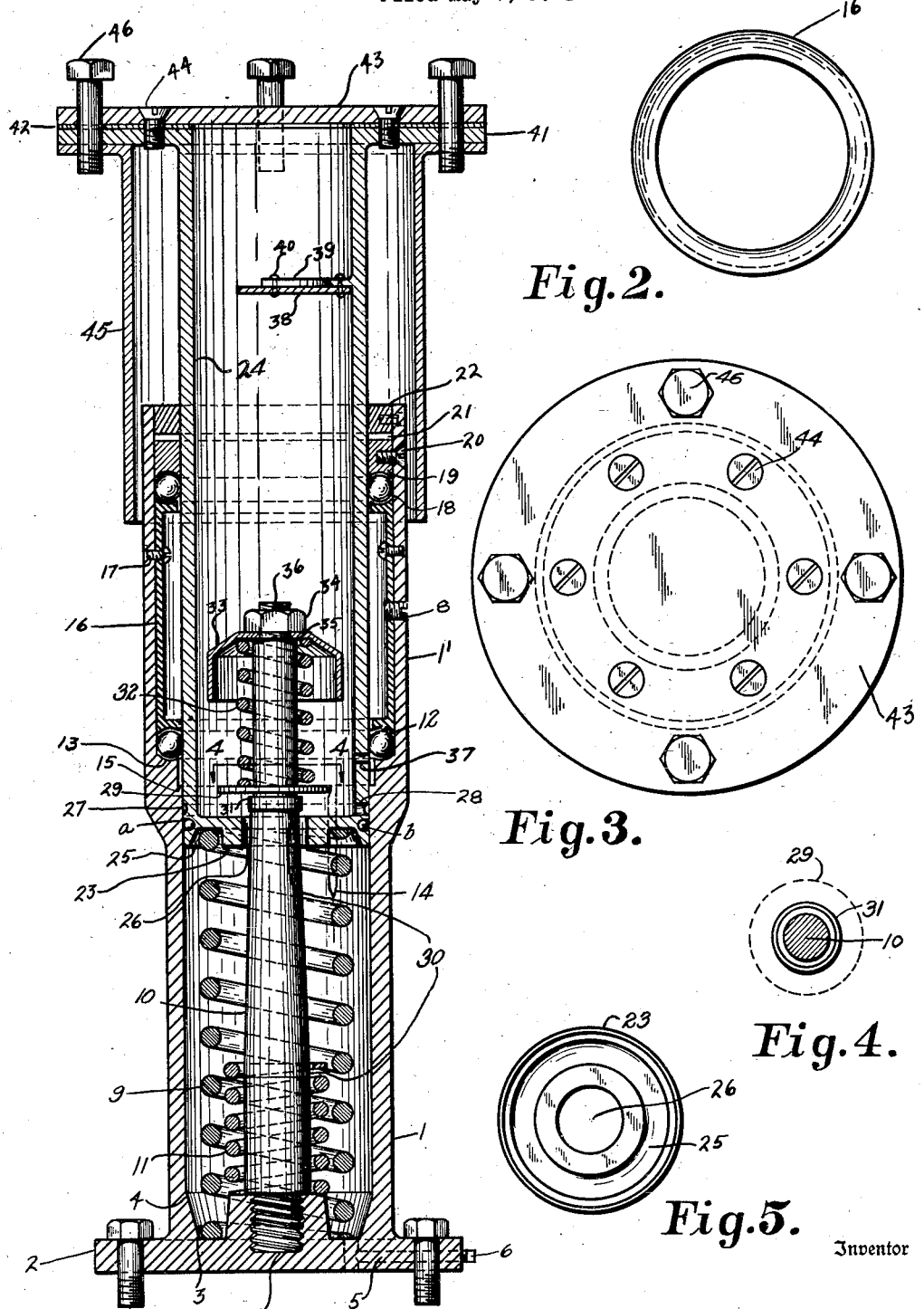
Figure 2 is a broken away plan view showing a bearing frame for roller balls.
Figure 3 is a plan view of the top of the piston with the cover attached.
Figure 4 is a transverse section indicated by line 4—4 in Figure 1, showing the standard and its collar, the outer edge of the disc being shown in dotted lines.
Figure 5 is a view of the bottom of the piston head showing an annular aperture and a circular slope edged groove.

Describing the invention in detail, with reference to the drawing by numerals in the illustrated embodiment thereof, the invention (made preferably of metal parts, unless otherwise stated), includes a cylindrical container 1, having an enlarged part 1' having walls concentric with the walls of cylinder 1 and opening at its top, said cylinder 1 being closed at its bottom and provided with a base 2.

The inside bottom of cylinder 1 is provided with a centrally disposed circular groove 3 with slope edges 4, the said slope edges being a guide for spring 9 into groove 3, which acts as a seat for main spring 9 and prevents main spring 9 from contact with the cylinder walls.

Base 2 is provided with fluid drain port 5, which may be opened or closed by fluid port screw 6 for the purpose of removing fluid from cylinder 1 or cleaning it. Base 2 is provided with a centrally disposed standard hole 7, preferably threaded, to receive and secure standard 10 in place. At junction of cylinder 1 with cylinder 1' is a circular ledge 15 which acts as a division and also as a settling place for residue from roller balls 12.

The part of cylinder 1' contains also circular ledge 13 disposed transversely to the cylinder, which is a roller ball race-way adjacent to the junction of cylinder 1 with the large part cylinder 1', said ledge 13 supporting roller balls 12.

At 16 is shown disposed in the circular area of cylinder 1', an annular bearing sleeve or frame for roller balls, secured against cylinder 1' by keepers 17. The bearing frame or sleeve 16 is provided at the upper and lower ends with inwardly projecting flanges which serve as a race or bearing to maintain the series of balls 12 and 18 at right angles to the longitudinal axis of the cylinder 1. The balls 12 being held in operative position by the lower flange of the said bearing frame 16, and the balls 18 being supported by the upper flange of said bearing frame 16.

At numeral 8 is indicated a sealed port through cylinder 1' and bearing sleeve 16 which permits checking and refilling fluid in the mechanism.

Numeral 19 indicates a bearing ring which is disposed in cylinder 1' adjacent to and holding in place balls 18. Bearing ring 19 also closes the device by fitting slidingly around piston 24, and is held in place by screws 20.

Numeral 21 indicates a ring of hard grease disposed above bearing ring 19, serving to lubricate and seal the space between bearing ring 19 and piston 24.

Numeral 22 indicates a felt wiper ring disposed inside cylinder 1', above grease ring 21 and serves as a wiper and cleaner of piston 24.

Roller balls 12 and 18 are each a series of balls disposed transversely around the inside of cylinder 1', the proportion of parts being such that the balls will engage the surface of the piston 24 slidingly and provide bearings therefor.

Numeral 14 indicates a groove passage in the wall of cylinder 1, making junction or port from cylinder 1 to cylinder 1' and tapered in the part towards the base of cylinder 1, its function being to provide a passageway between fluid in cylinder 1 and cylinder 1' which closes when piston 24 moves inside cylinder 1 past cylinder groove passage 14.

At numeral 24 is indicated a hollow cylindrical piston provided with a circular flange top. It is provided with a piston top cover 43, preferably disc-shape, adapted to be secured to the flanged piston top 41 by bolts 44, and made air tight by inclosing circular gasket 42. Piston 24 is provided with an outside groove-shaped fluid ring 27 disposed circularly in that part of the piston entering cylinder 1, said fluid ring being connected with the interior of piston 24 by fluid ring port 28 through the wall of piston 24, the purpose of which is to conduct a supply of fluid from the inside of piston 24 to the fluid ring 27 in contact with the walls of cylinder 1 for lubricating purposes. Piston 24 is provided with a fluid port 37 connecting the interior of piston 24 with the interior of cylinder 1', the purpose thereof being to communicate fluid back and forth between the two areas and maintain a common liquid level, and said fluid channel is automatically shut off when piston 24 is moved inwardly in cylinder 1. Piston head 23 is provided with a circular recess $a$ in its outer wall, disposed transversely relative to the piston with roller balls $b$ mounted in the recess slidingly engaging cylinder 1, the purpose thereof being to prevent friction as the piston moves in cylinder 1. The bottom of piston head 23 is provided with a centrally disposed circular slope edge groove 25, the purpose of which is to guide and provide a seat for main spring 9 when it comes in contact therewith, thus preventing the main spring from contact with the cylinder walls. Piston head 23 also is provided with a circular, centrally disposed piston hole 26, the purpose of which is to receive standard 10, also to provide an opening for the passage of liquid and air back and forth between the interior of cylinder 1 and the interior of piston 24. Piston 24 is slidingly mounted in bearing ring 19 and cylinder 1 with roller balls $b$ slidingly engaging cylinder 1, and the piston slidingly engages roller balls 12 and 18, Figure 1 shows the piston in its normal position with the mechanism not under compression.

Numeral 10 indicates a standard which is disposed centrally, and is preferably round, and threaded in the standard hole 7 in base 2. The purpose of standard 10 is to provide a mount for snubber spring 11, to regulate the flow of fluid and air back and forth between cylinder 1 and piston 24 through piston hole 26, and to provide a mount and support for disc 29, top spring 32, fluid washer 33 and keeper 34. Standard 10 is provided with a tapering decrease in diameter tapering upwardly from base 2 between points indicated by numeral 30, said tapering part operating as a choke or regulator of liquid and air flow through piston hole 26 as piston 24 moves inwardly and outwardly in cylinder 1 by decreasing and increasing the passageway for liquid and air through piston hole 26. Standard 10 also is provided with a circular enlargement the collar 31 which acts as a choke or regulator of liquid flow through piston hole 26 when piston hole 26 moves over collar 31, thus retarding movement of piston 24, and said collar also serves as a seat for disc 29. Standard 10 also is provided with a circular ledge 35 which is a seat for fluid washer 33. The upper end of standard 10 is threaded for affixing keeper 34. Standard 10 has a square standard head 36 for use in connecting and disconnecting the standard in base 2. The parts are of such proportions that it does not come in contact with plate 38.

Numeral 11 indicates a snubber spring seated on base 2, mounted around standard 10. Its purpose is to act as an auxiliary spring by coming in contact with piston head 23 in case of extreme compression or disabling of main spring 9.

Numeral 9 indicates a main spiral spring of proportionate size and tension to provide spring resistance and recoil against piston 24. It surrounds standard 10, one end is seated in groove 3 in base 2, and one end of the main spring is seated in groove 25 in piston head 23. The purpose of main spring 9 is to provide resilient resistance to movement of piston 24 inwardly in cylinder 1 and to provide resilient recoil for movement outwardly of piston 24 in cylinder 1.

Numeral 29 indicates a flat disc of greater diameter than the piston hole 26 provided with a round hole disposed centrally, proportioned to move slidingly on standard 10 above collar 31. Disc 29 is mounted on standard 10 and is disposed on collar 31. Disc 29 serves as a seat and lifter for top spring 32 and also as a fluid jet breaker for fluid forced out of cylinder 1 through piston hole 26 as piston 24 moves inwardly in cylinder 1.

Numeral 32 indicates spiral top spring of proportionate size and tension to resist movement of piston 24 outwardly in cylinder 1, said spring 32 being mounted on standard 10, its lower end seated against disc 29 and the upper end engaging fluid washer 33. Top spring 32 serves the purpose of preventing movement of piston 24 outwardly from cylinder 1 by means of engagement of inside of piston head 23 with disc 29, thus compressing top spring 32 which recoils and returns piston 24 to place.

Numeral 33 indicates a centrally apertured fluid washer of circular, cup-shape of lesser diameter than the piston. Said fluid washer is mounted on standard 10 by seating its aperture on ledge 35 and tightening it in place by keeper 34 with its open end facing toward and partially surrounding top spring 32. Said fluid washer 33 serves the purpose of providing a seat for one end of top spring 32 and also tends to prevent agitation of liquid in piston 24 and prevent mixing of liquid and air by obstructing and controlling motion of liquid in the piston. The proportion of parts is such that it does not engage piston 24 or disc 29.

Numeral 38 indicates a segmental plate covering less than the full area of the inside of piston 24. Plate 38 is seated transversely on a ledge 39 running partly around the inner wall of piston 24 and is secured by keepers 40. Proportion of parts is such that the plate is located far enough away from standard 10 so the two members cannot collide during movement of the piston. The plate tends to obstruct and control motion of liquid and air in piston 24 and prevent the mixing of air and liquid.

Numeral 45 indicates a cylindrical hanger shield of inverted cup-shape which is provided with a flange at one end to be secured to the piston top 41 by any suitable means, bolts 46 being used for this purpose. This circular member 45 is of greater diameter than the extension 1' of the cylinder 1 and is of such proportions that it extends downwardly from the cover a sufficient distance to surround the upper portion of the part 1' of the cylinder, the function of this part being to act as a shield against dirt and foreign objects for the piston and part 1' of the cylinder. Bolts 46 serve also to fasten the mechanism to any object. Numeral 47 shows bolts for securing the base of the mechanism to any object.

V

The parts may be conveniently assembled. Standard 10 may be threaded in base 2, snubber spring 11 mounted over standard 10 and seated on base 2, main spring 9 mounted over standard 10 and seated in groove 3 in base 2, the annular bearing sleeve 16 inserted in cylinder 1', roller balls 12 and roller balls 18 inserted in their respective race-ways, bearing ring 19 inserted in cylinder 1' and secured in place, grease ring 21 and felt wiper ring 22 inserted in place in cylinder 1', shield 45 placed over cylinder 1'. Piston head 23 may be inserted in the top of cylinder 1', slid past the felt wiper ring 22, grease ring 21, bearing ring 19, and both sets of roller balls, until the slope edge groove 25 has contacted and seated main spring 9 and piston hole 26 has enclosed standard 10 past collar 31. Disc 29 may be mounted on standard 10 and seated on collar 31. Top spring 32 may be mounted around standard 10 until one end rests on disc 29. Fluid washer 33 may be mounted by its aperture on standard 10 and seated on ledge 35 by the affixing of keeper 34. Sufficient oil or fluid may be inserted in piston 24 to fill cylinder 1 and fill cylinder 1' and piston 24 to about the level of keeper 34 in piston 24. Plate 38 may be seated on ledge 39 and secured by keepers 40, gasket 42 may be affixed on the flanged top of piston 24, covering the open end of the piston. Piston top cover 43 may then be affixed air tight to the flanged top of piston 24, with or without suitable cement, and secured in place by top bolts 44. Shield 45 may then be lifted to meet the flanged top of piston 24 and secured in place by keepers 46. The assembled device may then be affixed at its base to any object (not shown) by keepers 47 and affixed at its top to any object (not shown) by keepers 46.

VI

Referring now to the use of the invention, the base 2 is attached to or rested on the surface against which spring or shock absorption is desired and as near perpendicular as may be to the horizontal plane of such surface. The piston top 41 is attached to the object upon which weight or shock is to be applied. When any weight or shock is put upon the object attached to piston top 41 or base 2, the weight or shock, depending upon its amount, causes piston 24 to move inwardly in cylinder 1 on roller balls b, 12 and 18, compressing main spring 9. The inward movement of piston 24 is resisted, slowed, and softened by main spring 9, by the resistance of oil or fluid in cylinder 1 which escapes through piston hole 26 around standard 10 and by the compression of air in piston 24. As the piston 24 compresses main spring 9, the escape of fluid from cylinder 1 is slowed and hydraulic resistance increased by the standard taper 30 on standard 10, which gradually reduces the passageway through piston hole 26 and gradually lessens the escape of fluid from cylinder 1 through piston hole 26, and helps to stop the compression of main spring 9. As piston 24 enters cylinder 1, the fluid escaping from cylinder 1 enters the piston and reduces the air space in the upper part of the piston, causing compression of the air contained therein, which increasingly resists the movement of the piston into cylinder 1 and helps to cushion and stop the movement of the piston into cylinder 1. The jet of fluid escaping from cylinder 1 through piston hole 26 is stopped and calmed by flowing against disc 29. The liquid agitation and mixing with air is also resisted by fluid washer 33 and plate 38 tending to hold the liquid in place. The movement of piston 24 into cylinder 1 is arrested in case of a great shock or weight being applied, by snubber spring 11.

When the movement of piston 24 into cylinder 1 is stopped, the piston 24 is moved on the roller balls outwardly from cylinder 1 by recoil of main spring 9, and by the expansion of air compressed in the top of piston 24. The outward movement of piston 24, however, is slowed and controlled by the return of fluid from piston 24 into cylinder 1 through piston hole 26, and the further piston 24 has entered cylinder 1, the more the taper 30 on standard 10 reduces the movement of fluid through piston hole 26, thus slowing and controlling the outward movement of piston 24 tending to prevent a jerky or sudden outward movement of the piston.

If piston 24 moves outwardly from cylinder 1, its movement is slowed and resisted by collar 31 on standard 10 when the collar meets piston hole 26 by reducing the flow of fluid from piston 24 into cylinder 1, and such outward movement of piston 24 is arrested by lifting against disc 29 and compressing top spring 32, which recoils and returns piston 24 to place. Piston 24 fits slidingly in cylinder 1 retarding fluid from rising between the walls of piston 24 and cylinder 1 into the space in cylinder 1' above roller balls 12. If the fluid level in cylinder 1', above roller balls 12, arises above the level of the fluid in piston 24, the fluid level is restored by fluid returning inside piston 24 through fluid port 37 in piston 24 and cylinder fluid passage 14 in the wall of cylinder 1. When piston 24 is thrust inwardly in cylinder 1, compressing main spring 9, the fluid port 37 moves inwardly in the slidingly fitting part of cylinder 1, automatically shutting off fluid port 37 until it rises again into the open space above ledge 15. And cylinder fluid passage 14 is likewise automatically opened and closed by the inward and outward movement of piston 24 so that when piston 24 is moved into cylinder 1, both fluid port 37 and cylinder fluid passage 14 automatically shut off and do not permit the fluid under compression in cylinder 1 to escape through them.

The roller balls 12 and 18 slidingly engage cylinder 1' and the walls of piston 24, and roller balls b slidingly engage cylinder 1, allowing free movement of the piston inwardly and outwardly and holding piston 24 tightly in place, permitting vibrationless and frictionless movement without seizure by piston 24 when it moves inwardly and outwardly in cylinder 1.

Liquid may be added or changed as desired by opening sealed port 8 and drain port 5.

The whole mechanism is self-oiling if filled with oil to even with the fluid check sealed port 8. Ledge 15 is provided for a settling place for dirt which might otherwise accumulate around ball bearings 12.

It is obvious that the rate of compression of spring 9 may be regulated by using a stiffer or softer spring. Obviously, the hydraulic shock absorption and hydraulic resistance to the movement of piston 24 may be changed at will by enlarging or decreasing the piston hole 26 and enlarging or decreasing the tapered part 30 on standard 10, thus increasing or decreasing the flow of fluid through piston hole 26.

It will be observed from the drawing that if the mechanism in an upright position is filled with oil to the level of the keeper on the standard, a full compression of the main spring by the piston will send oil from the cylinder into the piston in volume sufficient to reduce the air space about one-half. If such proportions were maintained in the parts and the diameter of the piston increased, the air resistance and recoil could be increased to a great degree and correspondingly reduced by reducing the diameter of the piston.

It is obvious that if the mechanism were filled with liquid to the level of the keeper on the standard while standing upright, and then laid in horizontal position, the liquid would move in such a way that air would enter the cylinder 1 and return toward its original location if the mechanism were moved toward an upright position.

Obviously, the size of the various parts for the mechanism may be increased or decreased in proportion as the amount of weight to be carried is increased or decreased and the amount of shocks to be absorbed may be increased or decreased in force, without dispensing any of the elements of the mechanism as described.

Some of the advantages of this mechanism are that it utilizes in one mechanism the elements of hydraulic and air shock absorption, coil spring, resistance of air compression, recoil of air expansion, and hydraulic resistance and control of movement, all co-acting in automatic combination with a minimum of friction provided by the anti-friction bearings, the spring seats, the lubricating mechanism, and other elements, to provide controlled spring movement and absorption of shocks.

The use of roller-balls slidingly engaging between the piston and cylinder, whether carried in a cylinder recess or a piston recess, reduces friction, reduces vibration and wear, and reduces the amount of power necessary to cause movement of the piston in the cylinder, thus bringing ease and smoothness of operation and a saving in wear.

I claim as my invention:

1. In shock absorbing mechanism a hollow cylinder provided with a base, a hallow piston slidingly mounted in the cylinder and provided with an apertured head-member, a standard secured in the base of the cylinder and extending upwardly through the piston-head aperture and provided with a collar on the part projected inside the piston, an apertured disc slidingly mounted on the standard and disposed on the collar and capable of engaging with the inside of the piston-head, a keeper on the standard above the disc, spring means between the keeper and the disc for resisting outwardly movement of the piston and spring means between the base of the cylinder and the head member of the piston for supporting the piston.

2. In shock absorbing mechanism a hollow liquid and air containing cylinder open at its top and provided with a base closing its bottom, a hollow cylindrical piston containing liquid and air and closed at its top and having an apertured head-member providing a passageway for air and liquid therethrough, the piston slidingly mounted in the cylinder, a standard secured in the base of the cylinder and extending upwardly through the piston-head aperture, spiral spring means in the cylinder for resisting a movement of the piston inwardly of the cylinder, and spring means secured on the standard inside the piston for resisting a movement of the piston outwardly of the cylinder.

3. In shock absorbing mechanism a hollow air and oil containing cylinder closed at its bottom and having a part of greater diameter opening at its top, an upright cylindrical spacer with terminal inwardly projecting flanges within and secured to that part of the cylinder of greater diameter, anti-friction balls arranged in cylindrical sections engaging the flanges of the cylindrical spacer, a hollow air and oil containing piston closed at its top and having an apertured head-member providing a passageway for liquid, said piston slidingly mounted in the smaller part of the cylinder and slidingly engaging the balls, air trapped in the piston above the liquid therein, and resilient means engaging and tending to resist a sliding movement of the piston relatively to the cylinder.

4. In shock absorbing mechanism a hollow liquid containing cylinder provided with a base closing its bottom, a hollow liquid and air containing piston with a closed top and having an apertured head-member providing a passageway for liquid, the piston slidingly mounted in the cylinder, a standard threaded in the base of the cylinder and extending upwardly through the piston-head aperture and provided with a collar on the part projected inside the piston, an apertured disc slidingly mounted on the standard and disposed on the collar and capable of engaging with the inside of the piston-head during outwardly movement thereof, a keeper on the standard above the disc, spring means on the standard between the keeper and the disc for resisting an outwardly movement of the piston and spring means between the head-member of the piston and the base of the cylinder tending to support the piston and resist inwardly movement thereof.

5. In shock absorbing mechanism a hollow cylinder provided with a base closing its bottom and having a part of greater diameter opening at its top, an upright cylindrical spacer provided with terminal inwardly projecting flanges within and secured to the enlarged part of the cylinder, antifriction balls engaging the said flanges and the enlarged part of the cylinder, a hollow piston closed at its top and provided with a head member slidingly mounted in the smaller part of the cylinder and slidingly engaging the balls, an aperture in the head of the piston for a liquid passageway, a standard secured in the base of the cylinder and extending through the aperture in the head of the piston and having a collar on the part projected inside the piston and a keeper on the part projected beyond the collar, an apertured disc larger than said piston aperture slidingly mounted on the standard and seated on the collar, a spiral spring on the standard between the keeper and the disc for resisting outwardly movement of the piston, a spiral spring in the smaller part of the cylinder tending to support the piston, an auxiliary spring in the smaller part of the cylinder mounted on the standard for resisting inwardly movement of the piston, a passageway for liquid movements connecting the piston with the enlarged part of the cylinder, a passageway for liquid movements connecting the enlarged and the smaller parts of the cylinder, both said passageways disposed so they may be substantially closed by movement of the piston inwardly of the cylinder, and a cylindrical bearing ring within and secured to the enlarged part of the cylinder adjacent to its open end and slidingly engaging the piston and tending to close the open end of the enlarged part of the cylinder.

6. In shock absorbing mechanism a hollow liquid and air containing cylinder provided with a base closing its bottom and having a part of greater diameter opening at its top, a bearing ring disposed in and near the top of the enlarged part of the cylinder, a standard in the cylinder threaded in the base and having a collar mounted thereon and provided with a keeper above the collar, an upright cylindrical spacer provided with terminal inwardly projecting flanges within and secured to that part of the cylinder of greater diameter, anti-friction balls arranged in cylindrical sections engaging the flanges of the cylindrical spacer, a hollow liquid and air containing piston slidingly mounted in the bearing ring and the cylinder, and slidingly engaging the balls and provided with an apertured head-member receiving the standard and providing a passageway for liquid and air, a spiral spring in the cylinder between the head-member of the piston and base of the cylinder, and a spiral spring in the piston disposed on the standard between the keeper and the head-member of the piston.

7. In shock absorbing mechanism a hollow liquid and air containing cylinder provided with a base closing its bottom and having a liquid and air containing part of greater diameter opening at its top, an upright cylindrical spacer with inwardly projecting flanges within and secured to that part of the cylinder of greater diameter, anti-friction balls in cylindrical sections engaging the flanges of the spacer and engaging the cylinder, a hollow liquid and air containing piston with a closed top and an apertured head-member providing a passageway for liquid and air, the piston slidingly mounted in the smaller part of the cylinder and slidingly engaging the balls, an upwardly tapered standard secured in the base of the cylinder and extending upwardly through the aperture in the piston head-member and provided with a collar on the part projected inside the piston, an apertured disc slidingly mounted on the standard disposed on the collar and capable of engaging with the inside of the piston head during outwardly movement thereof, a keeper on the standard above the collar, a spiral spring on the standard between the disc and the keeper tending to resist outward movement of the piston, a circular grooved spiral spring-seat with outwardly sloping edges recessed on the outer face of the piston head-member, a circular grooved spiral spring-seat with outwardly sloping edges recessed on the inside of the base of the cylinder, said spring-seats so disposed as to guide and seat a spiral spring, a spiral spring in the cylinder engaging said spring-seats and tending to support the piston, and a bearing ring within and secured to the enlarged part of the cylinder above the other contents thereof and slidingly fitting the piston and tending to confine the liquid and air in the enlarged part of the cylinder.

8. A combined spring and shock absorber comprised of a hollow cylinder having a liquid containing part of lesser diameter provided with a base closing its bottom and having a liquid and air containing part of greater diameter opening at its top, a hollow cylindrical liquid and air containing piston having a closed top and an apertured head-member providing a passageway for liquid, the piston slidingly mounted in the smaller part of the cylinder, trapped air in the piston above the liquid, an upwardly tapered standard threaded in the base of the cylinder and extending upwardly through the aperture in the piston head-member and provided with a collar on the part projected inside the piston, an apertured disc slidingly mounted on the standard and disposed on the collar and proportioned to be capable of engaging the inside of the piston head during outwardly movement thereof, a keeper on the standard above the collar, a spiral spring on the standard between the keeper and the disc for resisting an outwardly movement of the piston, spiral spring means between the head-member of the piston and the base of the cylinder tending to support the piston, a port passageway for liquid movements connecting the liquid containing part of the piston with the liquid containing enlarged part of the cylinder, a liquid passageway connecting the liquid containing enlarged part of the cylinder with the smaller part of the cylinder, both said liquid passageways so disposed that they may be substantially closed by inwardly movement of the piston, an upright cylindrical spacer provided with terminal inwardly projecting flanges within and secured to that part of the cylinder of greater diameter, anti-friction balls arranged in cylindrical sections engaging the flanges of the spacer and slidingly engaging the piston, a bearing ring above the liquid the air and the anti-friction means in the enlarged part of the cylinder and secured thereto and slidingly fitting the piston and tending to confine the contents of the enlarged part of the cylinder.

9. In a shock absorber, a piston of the class described, comprising a cylindrical tube provided with a cover closing its top and an apertured head-member providing a passageway for fluid, said piston also having recessed on the outer face of the head-member a circular grooved spiral spring seat having outwardly sloping edges for guiding and holding a spring, said piston being slidingly mounted in a hollow cylinder having a base closing its bottom and having a part of greater diameter opening at its top, said piston also provided with a circular recess in the outer wall of that part of the piston slidingly entering the cylinder, anti-friction balls in said recess slidingly engaging the cylinder, said piston provided with a port serving as a passageway for fluid between the piston and the enlarged part of the cylinder, the port so disposed it may be substantially closed by adjacence to the cylinder wall during movement of the piston into the cylinder, a standard secured in the base of the cylinder and extending upwardly through the aperture in the piston head-member and provided with a collar on the part projected inside the piston, a keeper on the standard above the collar, spring means on the standard between the collar and the keeper for resisting outwardly movement of the piston, and a spiral spring in the cylinder tending to support the piston with one end of the spring engaging the circular spring-seat in the head-member of the piston and the other end of the spring engaging the base of the cylinder.

10. In shock absorbing mechanism, a standard of the class described, said standard threaded in the base of a hollow cylinder provided with a base closing its bottom, said cylinder having a hollow piston having a cover closing its top and having an apertured head-member providing a passageway for fluid slidingly mounted in the cylinder, said standard projecting upwardly through the aperture in the piston head-member and comprising a round standard having a threaded end for securing in the base of the cylinder and a part of decreasing diameter tapering upwardly from the base and having a collar on that part projected inside the piston, said standard provided with a squared top for moving the standard and provided with a keeper threaded on the standard below the squared top, said standard having an apertured disc slidingly mounted on the standard disposed on the collar and a spiral spring between the disc and the keeper for resisting an outwardly movement of the piston, the tapered part of said standard proportioned to act as a metering pin for fluid passage through the piston aperture, and the collar on said standard proportioned to act as a metering part for fluid passage during movement of the collar in the piston aperture.

11. A combined spring and shock absorber of the class described, comprising a liquid and air containing cylinder, provided with a base closing its bottom and having an enlarged part of greater diameter opening at its top, a liquid and air containing hollow cylindrical piston provided with a cover closing its top and having an apertured head-member for a fluid passageway, the piston slidingly mounted in the smaller part of the cylinder, an upright cylindrical spacer with terminal inwardly projecting flanges within and secured to the part of the cylinder of greater diameter, anti-friction balls in horizontal sections engaging the flanges of the spacer and slidingly engaging the piston, an upwardly tapered standard threaded in the base of the cylinder and projecting upwardly through the aperture in the piston head-member and having a collar on the part projected inside the piston and a keeper above the collar, an apertured disc larger than said piston-head aperture slidingly mounted on the standard disposed on the collar, a spiral spring on the standard disposed on the disc for resisting outwardly movement of the piston, an apertured inverted cup-shaped member for resisting liquid movements mounted on the standard between said spiral spring and the keeper, a spiral spring-seat having outwardly sloping edges for guiding a spiral spring recessed in the outer face of the piston head, a spiral spring-seat having outwardly sloping edges for guiding a spiral spring recessed on the inner face of the cylinder base, a spiral spring in the cylinder engaging said spring seats and tending to support the piston, a port in said piston providing a liquid passageway between the inside of the piston and the enlarged part of the cylinder, said port so disposed that it may be substantially closed during inwardly movement of the piston by entering the smaller part of the cylinder, the cylinder provided with a liquid passageway between the enlarged and smaller parts of the cylinder, the last said passageway so disposed it may be substantially closed by the piston as it enters the smaller part of the cylinder, a circular transverse recess in the outer wall of the piston, anti-friction balls in said recess slidingly engaging the smaller part of the cylinder, a cylindrical bearing ring within and secured to the enlarged part of the cylinder above the anti-friction balls and slidingly engaging the piston, sealed port means for inserting and removing fluid from the mechanism, and means at the top and at the base for securing the mechanism.

12. In shock absorbing mechanism, a cylinder of the class described, comprising a hollow cylinder having a smaller part of lesser diameter and an adjoining enlarged part of greater diameter, the smaller end of the cylinder having a base closing it and the enlarged other end of the cylinder being open, a circular grooved spiral spring-seat recessed in the inside of said base, said spring-seat having edges sloping outwardly from the bottom of the spring-seat for guiding a spiral spring into the spring-seat, the cylinder provided with a liquid passageway connecting the enlarged part of the cylinder with the smaller part thereof for a passageway for liquid, said passageway so disposed it may be substantially closed by adjacence to the piston wall during inwardly movement of the piston in the smaller part of the cylinder, sealed port means for inserting and removing fluid from the cylinder, said cylinder having a hollow cylindrical piston with a closed top and an apertured head-member providing a fluid passageway slidingly mounted in the smaller part of the cylinder, said cylinder having a standard threaded in the base and extending through the aperture in the piston head-member, said cylinder also having one end of a spiral spring engaging the spring-seat in the base of the cylinder and the other end of the spring engaging the head-member of the piston and tending to support it, said cylinder having anti-friction balls in the enlarged part of the cylinder slidingly engaging the piston, said cylinder having a cylindrical bearing ring within and secured to the enlarged part thereof adjacent to the open end and slidingly engaging the piston and tending to confine the contents of the enlarged part of the cylinder.

13. In a shock absorber of the class described, means for preventing loss of liquid from the mechanism, comprising a liquid and air containing cylinder closed at its base and having a part of greater diameter opening at its top, a hollow cylindrical air and liquid containing piston closed at its top and having a head-member provided with an aperture for a liquid passageway, the piston slidingly mounted in the smaller part of the cylinder, a port in the piston wall connecting the inside of the piston with the part of the cylinder of greater diameter for a liquid passageway for drawing liquid into the piston from the enlarged part of the cylinder during outwardly movement of the piston, said port so disposed it may be substantially closed during inwardly movement of the piston by adjacence to the wall of the smaller part of the cylinder, and a liquid passageway connecting the enlarged and smaller parts of the cylinder and so disposed it may be substantially closed by the piston during its movement into the smaller part of the cylinder.

14. Spring means for a telescoping spring and shock absorber, comprising a hollow cylinder provided with a base closing one end and open at the other end, a hollow cylindrical piston provided with an apertured head-member for a passageway, the piston slidingly mounted in the cylinder, said means comprising a standard secured in the base of the cylinder and extending through the aperture in the piston and having a collar on the part projected inside the piston and a keeper on a part projected beyond the collar, an apertured disc slidingly mounted on the standard and disposed on the collar and engageable with the inside of the piston head during outwardly movement thereof, a spiral spring mounted on the standard between the disc and the keeper for resisting outwardly movement of the piston when the piston moves outwardly so the inside thereof engages the disc and tending to induce inwardly movement of the piston whenever the piston engages the disc.

15. In shock absorbing mechanism, a hollow cylinder having a base-member closing its bottom, an upwardly tapered standard mounted on the base-member and provided with a collar, a keeper threaded on the standard, a bearing-disc slidingly mounted on the standard and normally engaging the collar, a slidable, hollow piston closed at its top and having an apertured head-member receiving the upwardly tapered standard, a spring-member between the base-member and the piston, and a spring between said bearing-disc and threaded keeper of the standard.

16. In shock absorbing mechanism, a hollow liquid containing cylinder provided with a base closing its bottom and having a part of greater diameter opening at its top, said enlarged part of the cylinder provided with circular roller-ball raceways disposed therein transversely relative to the cylinder, roller-balls in the race-ways, a bearing-ring disposed in the enlarged part of the cylinder above the roller-balls, a hollow liquid-and-air containing piston closed at its top and having a circular roller-ball race-way in its outer wall disposed transversely relative to the piston and said piston provided with an open port providing a passageway for liquid between the piston and the enlarged part of the cylinder and said piston having a head-member provided with an aperture providing a passageway for liquid between the smaller part of the cylinder and the piston and said piston slidingly mounted in the bearing-ring and the smaller part of the cylinder and slidingly engaging the roller-balls, roller-balls mounted in the race-way in the piston wall and slidingly engaging the smaller part of the cylinder, a standard in the cylinder threaded in the base and extended through the aperture in said piston head-member and having a keeper at its top, and a spiral spring in the piston between the keeper on the standard and the head-member of the piston.

17. In shock absorbing mechanism a hollow cylinder provided with a base, a hollow piston slidingly mounted in the cylinder and having a head-member provided with a connecting passageway for liquid and air, fluid stored in the cylinder and piston, a spring in the cylinder between its base and the piston and tending to support the piston, a standard secured in the base of the cylinder and projected through the passageway in the piston, spring means secured on the standard inside the piston to resist movement of the piston outwardly during a portion of its possible travel in the cylinder, slidable means supported on an abutment on said standard engaging said spring means and substantially closing the passageway in the head-member of the piston during said portion of its possible travel in the cylinder, said standard being so shaped as to act as a means for metering the flow of fluid between the piston and cylinder.

18. In a shock absorber means for preventing loss of liquid from the mechanism, comprising a liquid containing cylinder closed at its base, a hollow liquid and air containing piston closed at its top and having a head-member provided with an aperture for a liquid passageway, the piston slidingly mounted in the cylinder, a reservoir for liquid adjacent to the piston and the cylinder, a liquid passageway in the piston wall connecting the inside of the piston with the reservoir for drawing liquid from the reservoir into the piston during outward movement of the piston, a liquid passageway connecting the inside of the cylinder with the reservoir, and means for substantially closing both said passageways during movement of the piston into the cylinder.

LOUIS W. SETZ.